United States Patent [19]

Russell et al.

[11] Patent Number: 5,757,803
[45] Date of Patent: May 26, 1998

[54] POTS SPLITTER ASSEMBLY WITH IMPROVED TRANSHYBRID LOSS FOR DIGITAL SUBSCRIBER LOOP TRANSMISSION

[75] Inventors: Mark A. Russell, Somerville; David B. Ribner, Andover, both of Mass.

[73] Assignee: Analog Devices, Inc., Norwood, Mass.

[21] Appl. No.: 562,981

[22] Filed: Nov. 27, 1995

[51] Int. Cl.$^6$ ............................................. H04M 11/06
[52] U.S. Cl. ........................................ 370/494; 370/497
[58] Field of Search .......................... 370/493, 494, 370/495, 496, 497, 480, 488; 379/402, 405

[56] References Cited

U.S. PATENT DOCUMENTS

| | | | |
|---|---|---|---|
| 3,875,339 | 4/1975 | Gruen et al. | 179/15 FD |
| 4,306,116 | 12/1981 | McClure et al. | 179/2 DP |
| 4,546,212 | 10/1985 | Crowder, Sr. | 370/488 |
| 4,932,022 | 6/1990 | Keeney et al. | 370/60 |
| 5,408,260 | 4/1995 | Arnon | 348/6 |
| 5,440,585 | 8/1995 | Partridge, III | 375/261 |
| 5,506,900 | 4/1996 | Fritz | 379/402 |
| 5,528,630 | 6/1996 | Ashley | 375/258 |
| 5,623,543 | 4/1997 | Cook | 379/402 |

FOREIGN PATENT DOCUMENTS

| | | |
|---|---|---|
| 0 266 151 A2 | 5/1988 | European Pat. Off. |
| 0 677 938 A1 | 10/1995 | European Pat. Off. |

OTHER PUBLICATIONS

Telephony, Mar. 21, 1994, pp. 30–31, 34, 36, 52 "A New Concept for Roadwork on the Superhighway" by Jerry Swenson.

Telephone, Jul. 12, 1993, pp. 20, 24–26, "ADSL: The on-ramp to the information highway" By Stephen Fleming and Micheal B. McLaughlin.

American National Standards Institute, Telecommunications Committee (ANSI/T1), Jan. 22–25, 1996, Irvine, CA, Meeting, "Splitter for VDSL", Author: John Cook, pp. 1–10.

IEEE Journal on Selected Areas in Communications, vol. 13, No. 9, Dec., 1995, "ADSL and VADSL Splitter Design and Telephone Performance", by John Cook and Phil Sheppard, pp. 1634–1642.

*Primary Examiner*—Douglas W. Olms
*Assistant Examiner*—Matthew C. Phillips

[57] ABSTRACT

A data transmission system including a telephone service subscriber loop utilized for transmission of data including telephone service signals; a splitter operable for splitting the subscriber loop into a first transmission path including a low pass filter which accommodates a continuation of telephone service signal transmissions along the subscriber loop and a second transmission path, said second transmission path including a capacitive element for attenuating the telephone service signals; and a digital subscriber loop transceiver coupled to the second transmission path for implementing high rate digital data transmission over the subscriber loop, the transceiver including a frontend processing circuit having a transmit path and a receive path, at least said receive path comprising a high pass filter for further attenuating said telephone service signals. The capacitive element in the second transmission path and the high pass filter in the receive path of the transceiver frontend operate in conjunction to maintain transhybrid loss.

24 Claims, 5 Drawing Sheets

POTS SPLITTER ASSEMBLY WITH IMPROVED TRANSHYBRID LOSS FOR DIGITAL SUBSCRIBER LOOP TRANSMISSION

BACKGROUND OF INVENTION

There is currently a great deal of interest in high rate digital transmission over the telephone companies'. local subscriber loop. This is due in part to the desire to take advantage of the large installation base that already exists. Example systems include high-rate, asymmetric, and very high-rate digital subscriber loop, conventionally known as HDSL, ADSL, and VDSL, respectively. In the description which follows, reference to transmission that can be any of the three previously described will be termed xDSL. For ADSL and VDSL, and newer designs for HDSL, services are expected to share the same loop with analog telephony, otherwise known as plain old telephone service (POTS). This is typically done using frequency division multiplexing (FDM), where POTS nominally occupies the band between 400 and 3400 Hz, and the xDSL transmission occupies some predetermined band above POTS.

With reference to FIG. 1A, in order to isolate POTS 10 from an xDSL transceiver 12, a POTS splitter 14 is used. The splitter HPF provides the filtering required to separate the POTS and xDSL bands before being input to their respective transceivers. The splitter consists of a lowpass filter (LPF) 16 between the telephone and the line or loop 17, and a highpass filter (HPF) 18 between the xDSL transceiver and the loop, as shown in FIG. 1A. The isolation generated by the splitter is important for power limiting and the removal of transients. Limiting the power of the undesired service serves to reduce the dynamic range requirements on the circuits of the transceiver. Transients also exist, such as the low frequency POTS signalling voltages. These signals can have rms levels as high as 150 volts, which could saturate or possibly damage an XDSL transceiver. Due to these high voltages, the splitter filters will typically include inductors and/or transformers. A conventional high pass filter 18 is shown in FIG. 1B. The HPF 18 includes series capacitors 181–184 and inductor coils 185, 186. Since the cutoff frequencies are in the low kHz range, these coils will be expensive and physically large. Thus, the splitter filters contribute significantly to the cost and size of the overall design. The splitter LPF 16 is assumed to have a passband edge above the POTS band.

xDSL systems are often duplex systems, in which data is transmitted simultaneously in both directions over a single loop. The transmit and receive signals can be assigned to separate frequency bands, making an FDM system, or they can occupy overlapping bands, making an echo cancelled system. An exemplary block diagram of a typical xDSL transceiver 12 is shown in FIG. 2. The transceiver includes a frontend processor 20 and digital processing circuits 21, which in turn are coupled to the remainder of the transceiver circuitry. The digital processing circuits provide for the digital signal processing functions, such as modulation, echo cancellation, and equalization. The significance of the present invention is greatest for, although not exclusive to, the case when the spectra of the transmit and receive signals overlap somewhat in frequency. This will be the case if the system is echo cancelled, or if the signals have sidelobes that fall into the band of the other signal.

The frontend includes a transmit channel having a digital-to-analog converter 22, transmit filters 23 and a driver 24. The frontend also has a receive channel that includes an analog-to-digital converter 25, a programmable gain amplifier 26 and receive filters 27. The transmit and receive channels are coupled to a hybrid circuit 28 for connection to the telephone loop.

After digital processing, a transmit signal is converted to an analog signal by the DAC 22. In certain cases, some filtering also will be required by the transmit filters 23. Reasons for filtering include attenuation of spectral content of the transmit signal in the band of the receive signal, or to attenuate images resulting from the DAC operation so as to reduce power content at frequencies above the assigned xDSL band. The driver 24 is used to amplify the transmit signal to the level desired for transmission across the loop.

A conventional hybrid circuit is shown in FIG. 3. The purpose of the hybrid circuit is to provide a coupling of both the transmit and receive paths of the xDSL transceiver onto a single loop. The hybrid output of the receive path of the xDSL transceiver will thus be made up of both the desired signal from the loop and components of the undesired signal from the transmit path. The transmit signal is first passed through an amplifier with a low output impedance, and then converted to differential form by the transformer. The remainder of the circuit serves to provide a large transhybrid loss.

The transhybrid loss is the ratio of the signal power being transmitted to the portion of that power that leaks into the receive path of the same transceiver. When the hybrid is connected directly to the loop, the transmit voltage coupled onto the loop is dependent on the impedance seen looking into the loop. By including a matching circuit in the hybrid that approximates this impedance, an estimate of the voltage being coupled onto the loop is generated and subtracted from the received signal. With reference to FIG. 3 and assuming the voltage received from the loop is zero, the transhybrid loss is $$L_{TH} = V_T / V_R = ((R_T + Z_B)(R_T + Z_1)) / R_T(Z_B + Z_1).$$

Thus, if $Z_B$ is a very good approximation of $Z_1$, the transhybrid loss will be large.

The voltage coupled to the loop will be a function of the impedance Z1, which for the case of 9 kft of 26 wire is shown in FIG. 4. This impedance can be well matched using the rather simple hybrid matching circuit 50 of FIG. 5, which also works well for other loop gauges. As a result, the portion of the differential voltage V2 due to the transmit signal will be small, yielding a large transhybrid loss at the output of the subtractor. The matching circuit includes a resistance R2 in parallel with a capacitance C2, which is in turn in series with a resistance R1 and a capacitance C1.

In the receive path, the hybrid output is filtered to limit noise, and possibly to also further attenuate the residual signal from the transmit path. The latter will be desirable even if the transhybrid loss is large because attenuation can be such that the leakage from the transmit signal may still be significant relative to the desired signal. Such filtering would allow more of the dynamic range of the ADC to be used for the desired signal. The PGA 26 is then used to ensure that the input to the ADC 25 uses the full dynamic range of the ADC.

When a POTS splitter is connected between the hybrid and the loop, however, the impedance Z1 is altered, which has significant implications. XDSL systems typically use a sufficient guard band between the POTS and xDSL bands such that the change in impedance in the xDSL band is dominated by the HPF. FIG. 6 shows an example of the impedance looking out of the hybrid for the system of FIG. 3 augmented with a splitter whose HPF is a 4th order passive filter with cutoff of approximately 25 kHz. Relative to FIG. 4, a significant change in impedance can be seen for frequencies below about 125 kHz.

If this impedance change is not taken into account, a reduction in transhybrid loss results. Since the desired signal can be strongly attenuated by the loop, this can lead to the receive signal consisting in large part of the unwanted transmit signal. One effect is that the receive path filter must be able to handle the larger input dynamic range.

If there is no overlap in frequency of the desired and undesired signals, then the receive path filters can be used to remove the undesired signal. However, the increased dynamic range requirements of the filter will result in higher cost and power consumption. The situation is further complicated if there is frequency overlap, where in the reduction in transhybrid loss can lead to a significant increase in system complexity and/or a loss in performance. Specifically, the larger echo signal will increase the quantization noise of the ADC relative to the desired signal. Thus, it is desirable to provide some means for a large transhybrid loss when the splitter is included.

SUMMARY OF THE INVENTION

Accordingly, the present invention provides a data transmission system including a telephone service subscriber loop utilized for transmission of data including telephone service signals; a splitter operable for splitting the subscriber loop into a first transmission path including a low pass filter which accommodates a continuation of telephone service signal transmissions along the subscriber loop and a second transmission path, said second transmission path including a capacitive element for attenuating the telephone service signals; and a digital subscriber loop transceiver coupled to the second transmission path for implementing high rate digital data transmission over the subscriber loop, the transceiver including a frontend processing circuit having a transmit path and a receive path, at least said receive path comprising a high pass filter for further attenuating said telephone service signals. The capacitive element in the second transmission path and the high pass filter in the receive path of the transceiver frontend operate in conjunction to maintain transhybrid loss. The combination of the capacitive element in the second transmit path and the high pass filter in the receive path of the transceiver frontend serve to maintain both the transhybrid loss relative to a system with no splitter with no additional hardware in the hybrid circuit, and the dynamic range of the ADC of the transceiver frontend relative to the desired signal.

DETAILED DESCRIPTION OF THE ILLUSTRATED EMBODIMENTS

The present invention involves modifications to the splitter and/or transceiver that would result in the same transhybrid loss when a splitter is present as when a splitter is not used. A first exemplary embodiment includes replacing the splitter high pass filter with coupling capacitors, and a second exemplary embodiment includes adding high pass filters to the xDSL transceiver.

Figure 1A:
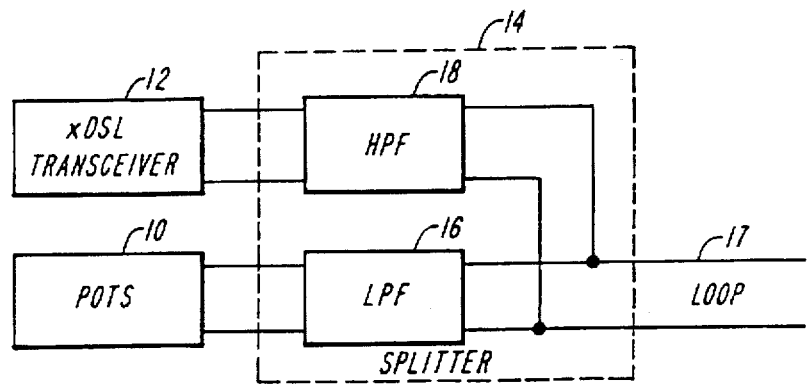
FIG. 1A shows a block diagram of conventional splitter utilized to couple a DSL transceiver to a POTS loop.
Figure 1B:
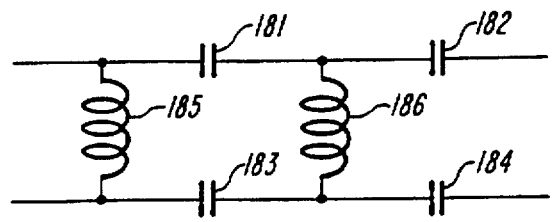
FIG. 1B shows a schematic of a conventional high pass filter.
Figure 7:
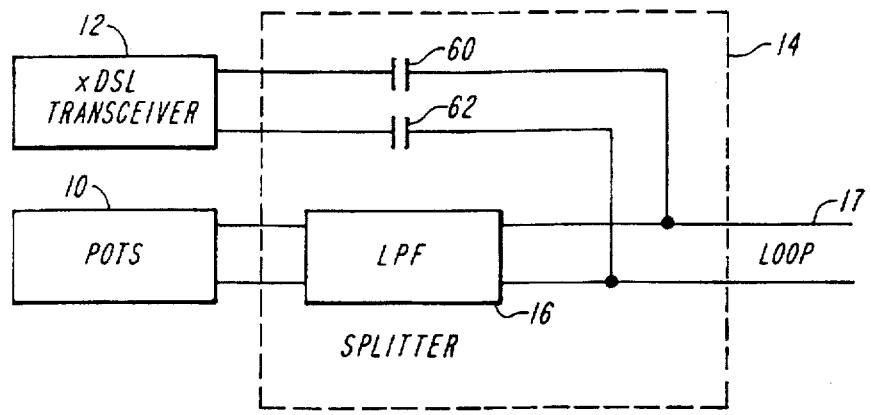
FIG. 7 shows an exemplary operational block diagram of a splitter in accordance with the present invention used to couple a DSL transceiver to a POTS loop.

Accordingly, with reference to FIG. 7, an exemplary block diagram illustrating similar components presented in FIG. 1 including the first embodiment of the present invention in which a pair of series capacitances 60, 62 are provided in the line between the loop 17 and the transceiver 12. The capacitances take the place of the high pass filter 18.

Figure 2:
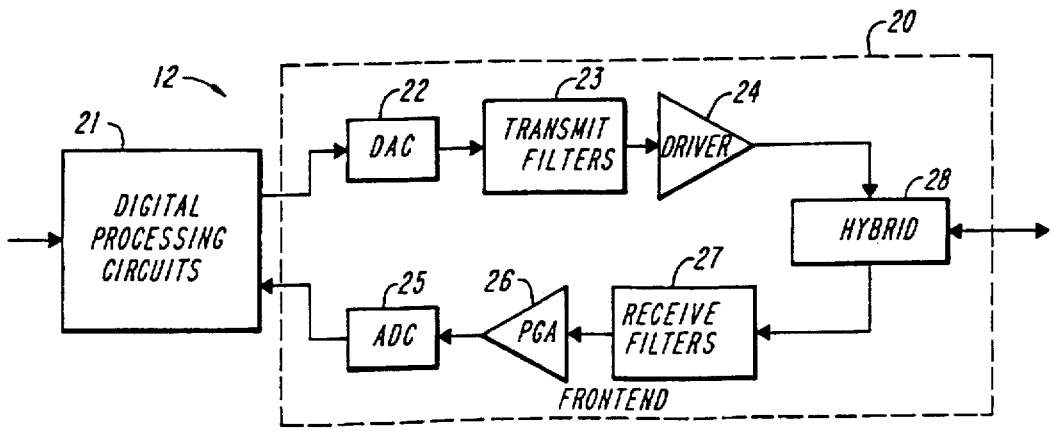
FIG. 2 shows a block diagram of a portion of a conventional DSL transceiver.
Figure 3:
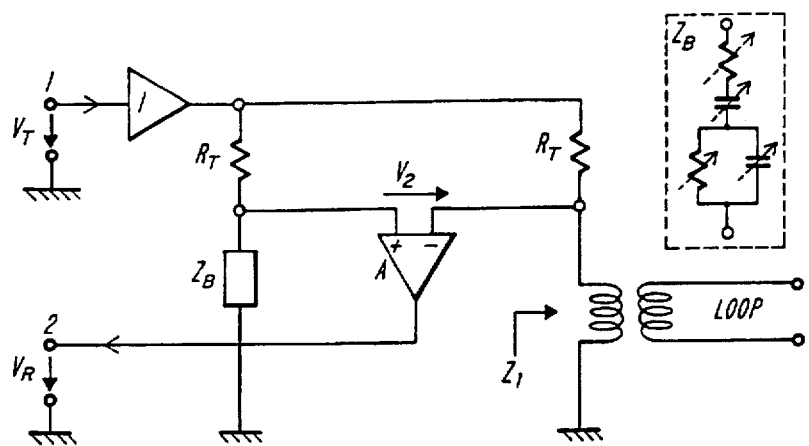
FIG. 3. shows a conventional hybrid circuit.
Figure 4:
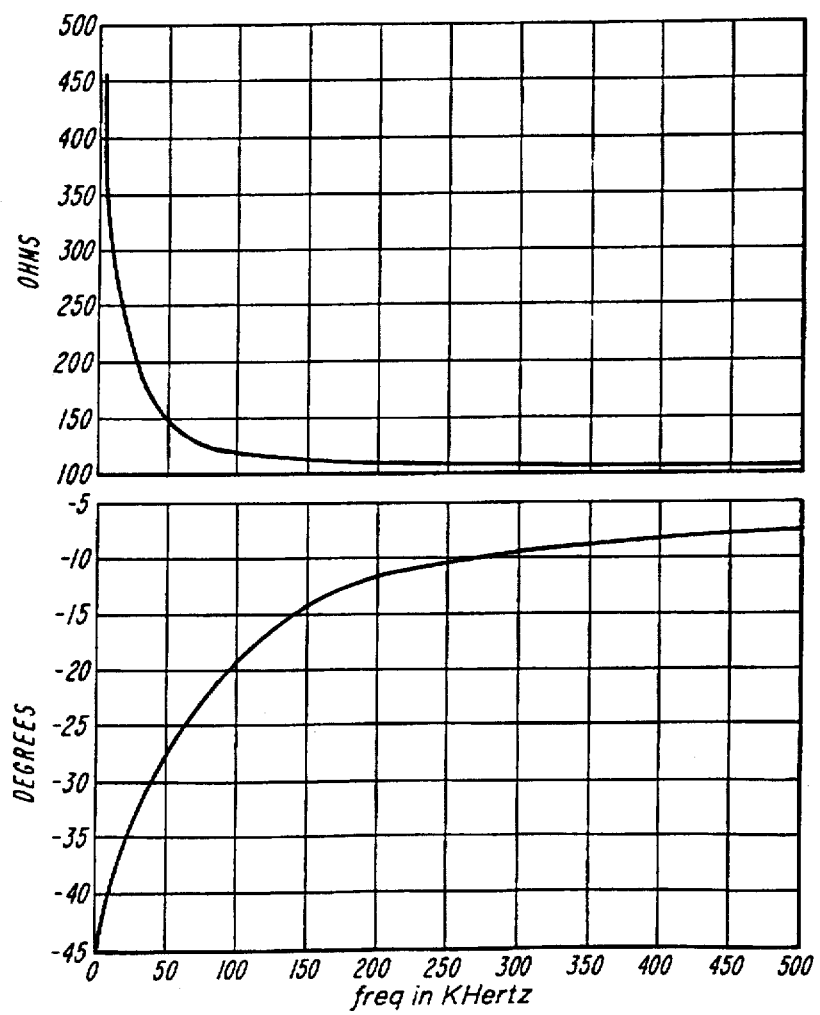
FIG. 4 shows a graph of the impedance associated with a hybrid circuit of the transceiver frontend without using a splitter for a typical loop with bridge taps.
Figure 8:
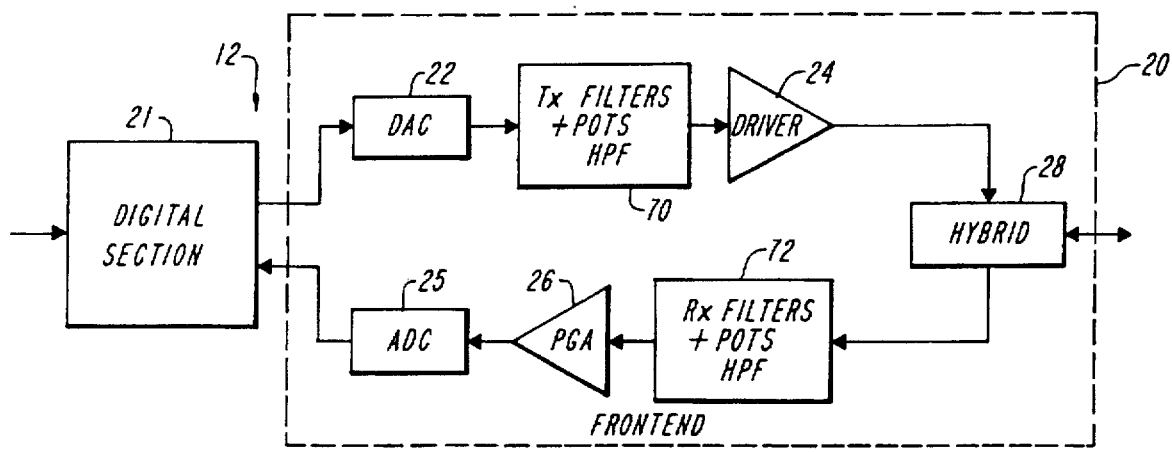
FIG. 8 shows an exemplary block diagram of a transceiver frontend in accordance with the present invention.

FIG. 8 shows an exemplary block diagram of a transceiver 12 as shown in FIG. 2 and including the second exemplary embodiment in which high pass filters 70 and 72 are implemented in the transmit and receive channels, respectively, of the frontend 20.

As stated previously, filtering is required between the loop 17 and the DSL transceiver 12 in order to attenuate the large POTS signaling voltages. It will be appreciated that the DSL transceiver acts as a resistive termination (typically between 100 and 135 Ohms), the series capacitors 60, 62 of FIG. 7 give an equivalent 1st order RC HPF between the DSL transceiver and the loop. With proper choice of the capacitor values, the receive voltage due to POTS signalling can be made small compared to that due to the transmit signal were a reduction in transhybrid loss allowed.

The first exemplary embodiment of FIG. 7 has two associated significant advantages. First, the same transhybrid loss as for the case of no splitter can be achieved by placing the capacitors 60 and 62 in series with the matching circuit of FIG. 5. Furthermore, since the matching circuit already has a series capacitance, the additional capacitance can be implemented through a simple component change of the series capacitance C1 of FIG. 5. Thus, a transhybrid loss equal to that with no splitter can be achieved with no additional hardware. The second advantage is the removal of the inductors of a conventional implementation of the HPF 18, which reduces both the cost and size of the overall design.

The attenuation provided by the coupling capacitors 60, 62 will be less than the conventional splitter. This can have implications on the filtering requirements in the transceiver. Specifications such as presented in American National Standard Institute, "Asymmetric digital subscriber line (ADSL) metallic interface", T1E1.4/95-007R2, outline the allowable interference from an XDSL signal in the POTS band.

If the transmit signal in combination with the splitter of FIG. 7 does not already meet these requirements, then an additional HPF (either analog or digital) will be required. Furthermore, although proper choice of the capacitor values will ensure that the POTS signalling voltages will be attenuated sufficiently to prevent saturation, contributions in the millivolt rms range will still occur. If the resulting reduction in the dynamic range relative to the desired signal at the ADC is deemed significant, then an additional HPF in the receive path of the transceiver frontend before the PGA will be necessary, as shown in FIG. 8. Despite the possible need for additional HPFs in the transceiver, these filters can be implemented using active discrete components or even integrated in custom silicon, which represents a significant reduction in cost and size relative to conventional designs.

Figure 5:
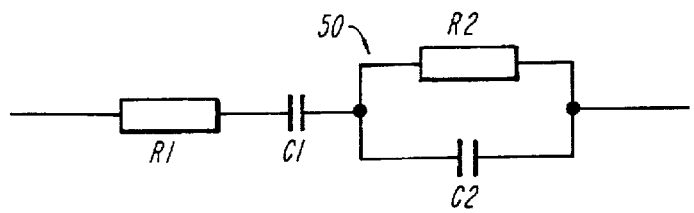
FIG. 5 shows an exemplary hybrid matching circuit.
Figure 6:
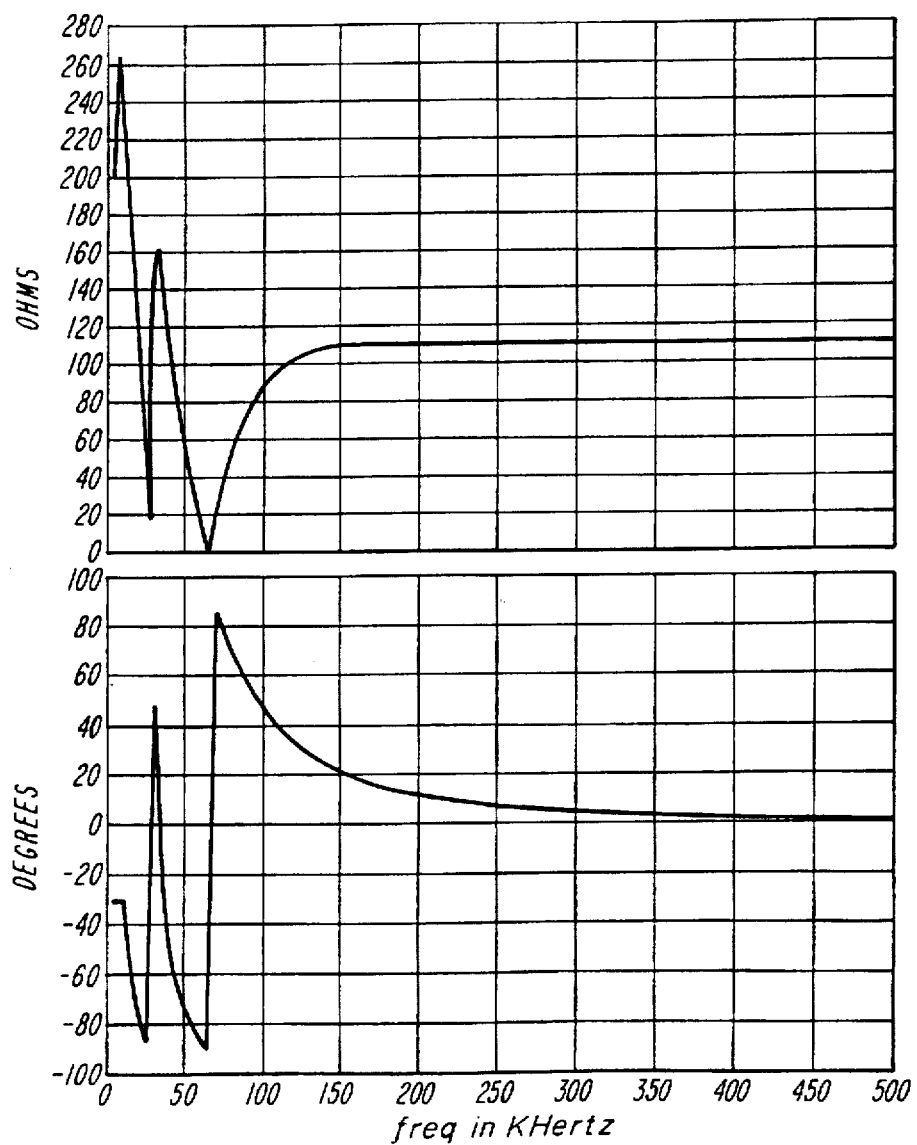
FIG. 6 shows a graph of the impedance associated with the hybrid circuit using the splitter of FIG. 1.
Figure 9:
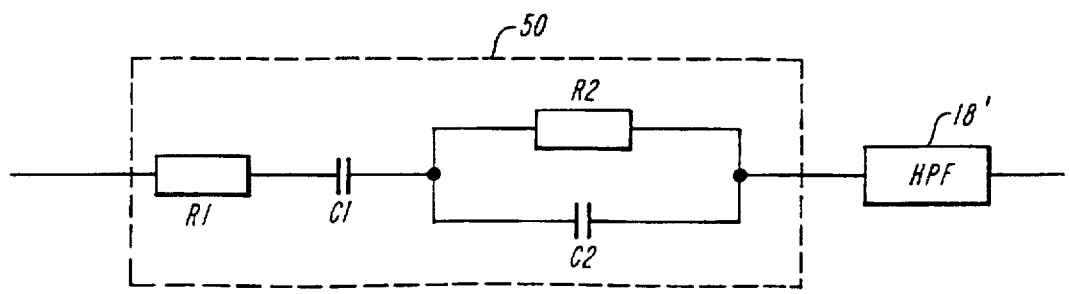
FIG. 9 shows an alternate embodiment of the present invention.

Another exemplary embodiment of the present invention shown in FIG. 9 involves using the conventional splitter of FIG. 1 and adding a second HPF 18 which is a duplicate copy of the conventional HPF used in the splitter in parallel with the hybrid matching circuit of FIG. 5. This embodiment will also maintain the transhybrid loss, but is less attractive due to the cost and size associated with the conventional HPF. If it were desired to modify the matching circuit to match the impedance of FIG. 6 below 100 kHz, it would be necessary to place a copy of the splitter HPF in series with the matching circuit of FIG. 5. The low cutoff frequency of this filter combined with the large input voltages that it must tolerate make this filter physically large and expensive to integrate. Thus, a modification of the matching circuit alone would require an increase in complexity and make an integrated solution for the hybrid prohibitively expensive.

An exemplary embodiment of the present invention will be illustrated for a system that transmits POTS and Asymmetric Digital Subscriber Line (ADSL) signals over the same twisted pair. The ADSL system is designed to transport up to 6 Mbps downstream from the telephone company's central office (CO) to a remote terminal (RT) in the home or office. The reverse (upstream) channel is required to transport a much lower rate, on the order of several hundred kbps. The transmission technique is discrete multitone (DMT), as defined in the ANSI T1E1.413 standard mentioned above. DMT breaks the transmission bandwidth, which extends out to 1.1 MHz, into 256 bands (also called bins) 4.3125 kHz wide. Bin n is thus centered at n×4.3124 kHz. Each bin is modulated with a different QAM symbol. The spectrum of a bin has a $sin(x)/x$ characteristic, and thus has content, called sidelobes, in all other bins.

In order to allow for a guard band between POTs an ADSL, bin 8 centered at 34.5 kHz is the first bin which is modulated with a non-zero symbol. Bins 8 and above do, however, have spectral content in the POTS band. A 2nd order Bessel HPF with cutoff frequency of 32 kHz in combination with the splitter of FIG. 7 provides sufficient attenuation in the POTs band to satisfy the requirements in the ANSI standards described above.

Figure 10:
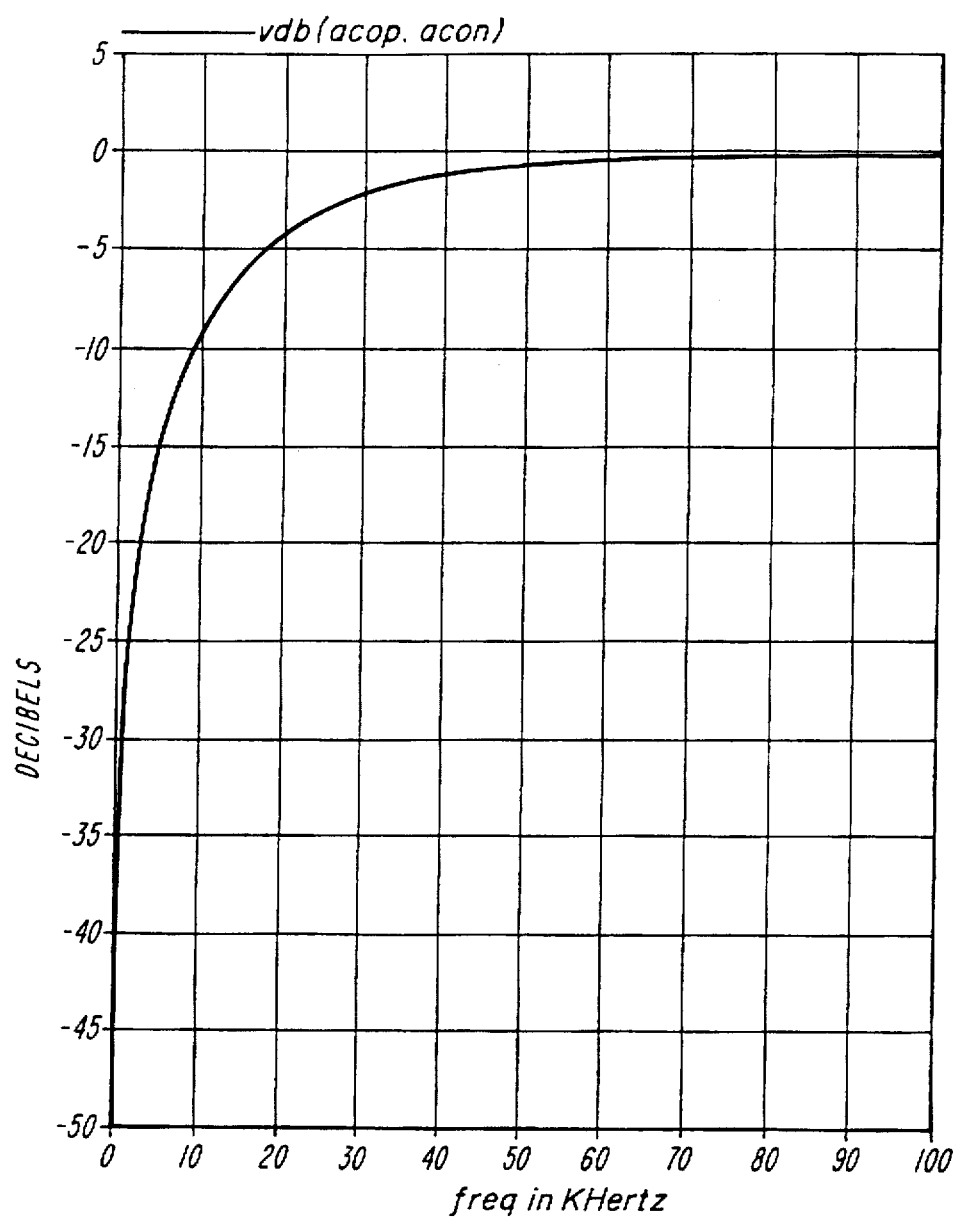
FIG. 10 shows a graph of a transfer function from the loop to an ADSL transceiver using the splitter of FIG. 7.

The ADSL transceiver is designed to act as an 120 Ohm resistive termination. By setting the capacitance value of FIG. 6 to 100 nF, the transfer function from the loop to the ADSL transceiver will be as shown in FIG. 10. The two greatest sources of voltage from POTS signalling are the tones sent for ringing and to indicate ringer-off-hook. The ringing voltage can be as high as 150 Vrms at a frequency as high as 68 the ringing voltage coupled to the ADSL transceiver after attenuation by the RC filter will be 37 m Vrms. The ringer-off-hook signal can have as much as 3 dBm of power at frequencies of 1400, 2060, 2450, and 2600 Hz. This translates to a total voltage coupled to the ADSL transceiver of 38 m Vrms. Since these signals are sinusoids, the peak voltage for both of these cases is about 50 m Vpp. By setting the dynamic range of the ADSL transceiver frontend to several volts, the influence on dynamic range of the POTS signals are made small. A 2nd order Bessel HPF, as the transmit path, can then be used to reduce the POTs voltage to the microvolt range.

Using the present invention including the above mentioned two 2nd order Bessel HPFs, no significant reduction in performance of the XDSL modem is observed relative to the case where neither POTS nor a splitter is present.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A data transmission system comprising:

a telephone service subscriber loop utilized for transmission of data including telephone service signals;

a splitter operable for splitting the subscriber loop into a first transmission path including a low pass filter which accommodates a continuation of telephone service signal transmissions along said subscriber loop and a second transmission path, said second transmission path including a first high pass filter for attenuating said telephone service signals; and a digital subscriber loop transceiver coupled to said second transmission path for implementing high rate digital data transmission over said subscriber loop, wherein said transceiver includes a hybrid circuit, and wherein a second high pass filter is added in series with a hybrid matching circuit of said hybrid circuit in order to maintain transhybrid loss relative to the case where said first high pass filter is not utilized.

2. The system of claim 1, wherein said transceiver includes a frontend processing circuit which incorporates said hybrid circuit and has a transmit path and a receive path, said receive path of said frontend processing circuit including a third high pass filter which further attenuates said telephone service signals, said third high pass filter serving to reduce the complexity of said first and second high pass filters.

3. The system of claim 2, wherein said transmit path of said frontend processing circuit includes a fourth high pass filter which attenuates signals transmitted by said transceiver in order to avoid interference with said telephone service signals.

4. The system of claim 1, wherein said hybrid matching circuit and said second high pass filter in series with said hybrid matching circuit each have a series capacitor whose placement allows the two to be combined into a single capacitor with a predetermined value.

5. The system of claim 4, wherein said first and second high pass filters comprise series capacitors, thus allowing the series combination of said hybrid matching circuit and said second high pass filter to be implemented using said hybrid matching circuit with an appropriate reduction of the series capacitor value.

6. The system of claim 5, wherein said series capacitors of said first high pass filter operate in conjunction with termination resistors associated with said transceiver as a first order RC filter between said telephone service subscriber loop and said transceiver.

7. The system of claim 1, wherein said transceiver includes a frontend processing circuit having a transmit path and a receive path, said frontend processing circuit including said hybrid circuit operable for coupling said transmit and receive paths to said telephone service subscriber loop, said hybrid circuit comprising hybrid matching circuit which approximates the impedance associated with both said subscriber loop and said first high pass filter, said matching circuit including a series capacitor which is reduced in value from a predetermined value so as to approximate the resultant impedance associated with said first high pass filter.

8. The system of claim 1, wherein said digital subscriber loop transceiver comprises an asymmetric digital subscriber loop (ADSL) transceiver.

9. The system of claim 1, wherein said digital subscriber loop transceiver comprises a high-rate digital subscriber loop (HDSL) transceiver.

10. The system of claim 1, wherein said digital subscriber loop transceiver comprises a very high-rate digital subscriber loop (VDSL) transceiver.

11. The system of claim 1, wherein said second high pass filter is identical to said first high pass filter.

12. The system of claim 1, wherein said second high pass filter has the same structure as said first high pass filter with component values which are scaled relative to said first high pass filter.

13. A data transmission system comprising:

a telephone service subscriber loop utilized for transmission of data including telephone service signals;

a splitter operable for splitting the subscriber loop into a first transmission path including a low pass filter which accommodates a continuation of telephone service signal transmissions along said subscriber loop and a second transmission path, said second transmission path including a capacitive element for attenuating said telephone service signals; and a digital subscriber loop transceiver coupled to said second transmission path for implementing high rate digital data transmission over said subscriber loop, said transceiver including a frontend processing circuit having a transmit path and a receive path, said receive path comprising a high pass filter for further attenuating said telephone service signals, wherein said capacitive element in said second transmission path and said high pass filter in said receive path of said transceiver frontend operate in conjunction to attenuate telephone service signals and allow transhybrid loss to be maintained relative to the case where said capacitive element is not utilized without any additional components in said transceiver.

14. The system of claim 13, wherein said transmit path of said frontend processing circuit includes a second high pass filter which attenuates signals transmitted by said transceiver in order to avoid interference with said telephone service signals.

15. The system of claim 13, wherein said capacitive element comprises a pair of series capacitors in the line between said telephone service subscriber loop and said transceiver.

16. The system of claim 15, wherein said pair of series capacitors operate as a first order RC high pass filter between said telephone service subscriber loop and said transceiver.

17. The system of claim 13, wherein said transceiver includes a frontend processing circuit having a transmit path and a receive path, said frontend processing circuit including a hybrid circuit operable for coupling said transmit and receive paths to said telephone service subscriber loop, said hybrid circuit comprising a matching circuit which approximates the impedance associated with both said subscriber loop and said capacitive element, said matching circuit including a series capacitor which is reduced in value from a predetermined value so as to approximate the resultant impedance associated with said capacitive element.

18. The system of claim 13, wherein said digital subscriber loop transceiver comprises an asymmetric digital subscriber loop (ADSL) transceiver.

19. The system of claim 13, wherein said digital subscriber loop transceiver comprises a high-rate digital subscriber loop (HDSL) transceiver.

20. The system of claim 13, wherein said digital subscriber loop transceiver comprises a very high-rate digital subscriber loop (VDSL) transceiver.

21. A data transmission system comprising:

a telephone service subscriber loop utilized for transmission of data including telephone service signals;

a splitter operable for splitting the subscriber loop into a first transmission path including a low pass filter which accommodates a continuation of telephone service signal transmissions along said subscriber loop and a second transmission path including a first high pass filter for attenuating said telephone service signals; and a digital subscriber loop transceiver coupled to said second transmission path for implementing high rate digital data transmission over said subscriber loop, said transceiver including a frontend processing circuit having a transmit path and a receive path coupled to said splitter via a hybrid circuit, said hybrid circuit including an impedance matching circuit and a second high pass filter in series, wherein said second high pass filter and said impedance matching circuit operate in conjunction to maintain transhybrid loss relative to the case where said first high pass filter is not utilized.

22. The system of claim 21, wherein said digital subscriber loop transceiver comprises an asymmetric digital subscriber loop (ADSL) transceiver.

23. The system of claim 21, wherein said digital subscriber loop transceiver comprises a high-rate digital subscriber loop (HDSL) transceiver.

24. The system of claim 21, wherein said digital subscriber loop transceiver comprises a very high-rate digital subscriber loop (VDSL) transceiver.

* * * * *